United States Patent Office 3,290,586
Patented Dec. 6, 1966

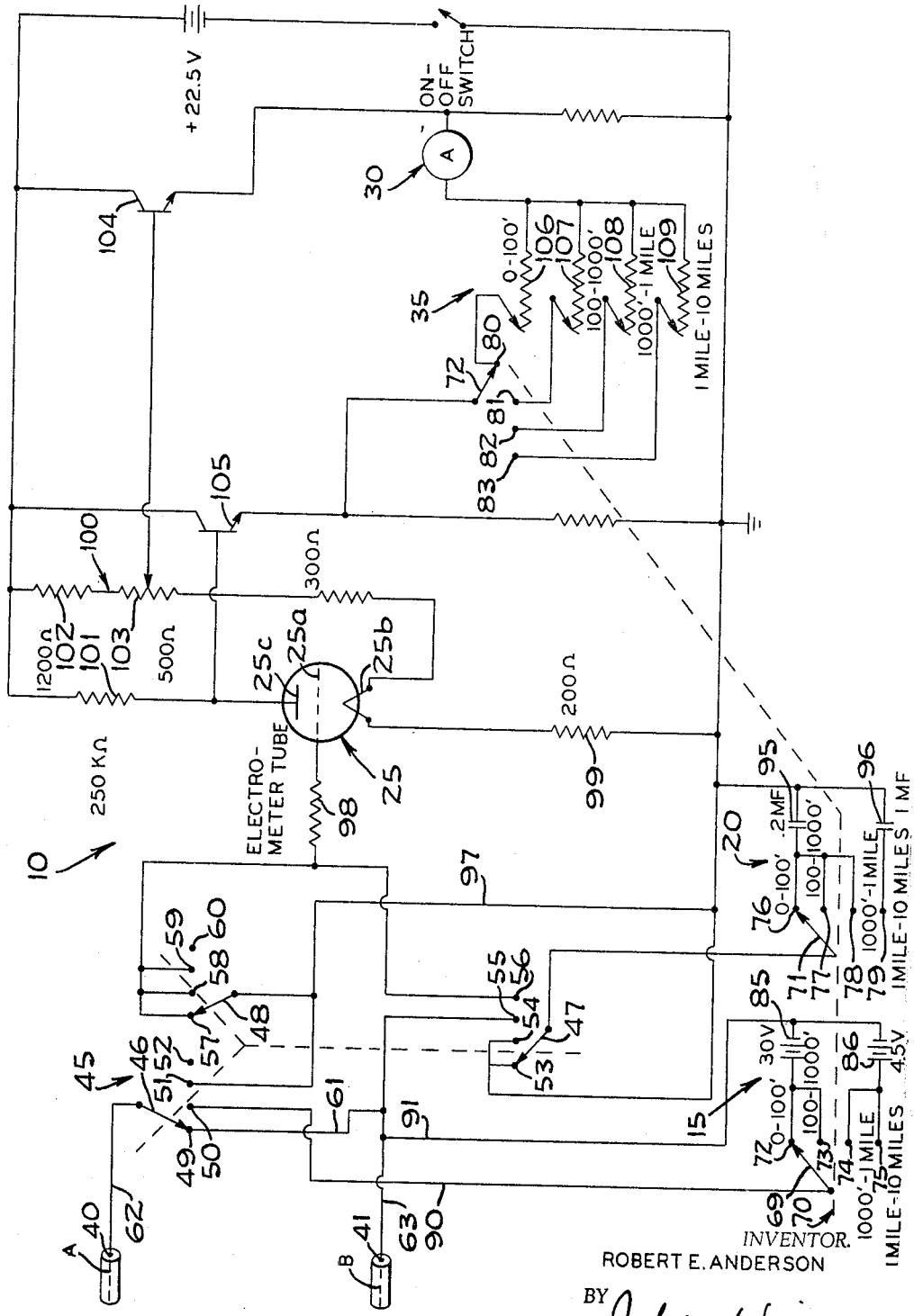

3,290,586
APPARATUS FOR MEASURING THE DISTANCE TO AN OPEN CIRCUIT IN A CABLE PAIR INCLUDING MEANS FOR STORING A CHARGE COMMENSURATE WITH SUCH DISTANCE
Robert E. Anderson, Sunnyvale, Calif., assignor to Tel-Design Inc., a corporation of California
Filed Aug. 4, 1964, Ser. No. 387,377
15 Claims. (Cl. 324—52)

The present invention relates in general to electrical cable testing equipment, and more particularly to an open cable pair locator.

An object of the present invention is to provide an improved device for detecting an open cable pair in an electrical system, such as a telephone transmission system.

Another object of the present invention is to provide apparatus for locating an open cable pair in an electrical system, such as a telephone transmission system.

Another object of the present invention is to provide apparatus for measuring the linear distance of an open cable pair from the apparatus.

Another object of the present invention is to enable an operator to locate in linear distances an open cable pair in an electrical system, such as a telephone transmission system.

Other and further objects and advantages of the present invention will be apparent to one skilled in the art from the following description taken in conjunction with the accompanying drawing, which is a schematic circuit diagram of the open cable locator of the present invention.

The open cable locator 10 of the present invention has a pair of conductors A and B under test connected thereto, which conductors may be conventional twisted or helically wound telephone transmission line conductors. Initially, any residual voltage across the conductors A and B is removed or dissipated. Thereupon, the conductors A and B have a predetermined reference voltage from a suitable source 15 of direct current voltage applied thereacross, which charges the conductors A and B to a potential related to the capacity of the uninterrupted portions of the conductors A and B connected to the open cable locator 10.

It is apparent that the conductors A and B produce a capacitive effect by virtue of the insulation or dielectric material thereof surrounding the conductors thereof. The capacity of the conductors A and B will vary proportionally with the linear distance of uninterrupted tested portions of the conductors A and B.

Now, the charge or potential stored through the capacitive effect of the conductors A and B is transferred to and stored in a suitable potential storage unit 20. At this time, the potential charge stored in the potential storage unit 20 is fed to the input of a conventional electrometer tube 25, which is a high impedance device. The output of the electrometer tube 25 is amplified and is fed to a suitable microampere meter 30 through a calibrating network 35. As a consequence thereof, the meter 30 is calibrated to read directly in linear measurements the distance of the opening in the conductors A and B from the open cable locator 10.

Illustrated in the single figure is the open cable locator 10 of the present invention, which comprises terminals 40 and 41. Connected to the terminals 40 and 41 are the conductors under test A and B, respectively.

The open cable tester 10 also includes a conventional manually operated switch 45 having wipers 46–48 that sweep in unison. Contacts 49–52 are engaged in succession by the wiper 46 and contacts 53–56 are engaged in succession by the wiper 47. Similarly, the wiper 48 contacts in succession the contacts 57–60.

Initially, the wipers 46–48 of the switch 45 rest on the contacts 49, 53 and 57, respectively. As a consequence thereof, any residual voltage or charge on the test conductors A and B is dissipated or removed by placing a conductor 61 across the terminals 40 and 41 by way of the wiper 46, the contact 49 and conductors 62 and 63.

After the residual voltage or charge across the conductors A and B is dissipated or removed, the wipers 46–48 of the switch 45 are advanced by the operator to rest on the succeeding contacts 50, 54 and 58, respectively. As shown in the drawing, the wiper 46 is connected to the conductor A and the contact 50 is connected to the source 15 of direct current voltage. Included in the source 15 of direct current voltage is a wiper 69 of a conventional manually operated switch 70. The switch 70 also includes wipers 71 and 72 that operate in unison with the wiper 69. The wiper 69 engages in succession contacts 72′–75 and the wiper 71 engages in succession contacts 76–79. Similarly, the wiper 72 contacts in succession the contacts 80–83.

The source 15 of direct current voltage comprises two reference potential sources, such as batteries 85 and 86 of different reference voltage magnitudes. The contacts 72 and 73 of the switch 70 are connected to the battery 85, which in the preferred embodiment is a 30 volt battery, and the contacts 74 and 75 are connected to the battery 86, which in the preferred embodiment is a 4.5 volt battery.

When the wipers 46–48 are resting on the contacts 50, 54 and 58, respectively, a selected predetermined reference voltage is applied across the conductors A and B to charge the conductors A and B to a potential related to the capacity of the uninterrupted portions of the conductors A and B connected to the terminals 40 and 41. The voltage source applied across the conductors A and B will be either the battery 85 or the battery 86 dependent upon the position of the wiper 69 of the switch 70 relative to the contacts 72′–75. The reference voltage is applied across the conductors A and B over the following path: terminal 40, conductor 62, wiper 46, contact 50, conductor 90, wiper 69, the source 15 of reference direct current voltage, conductor 91, conductor 63 and terminal 41.

Connected to the contact 51 of the switch 45 is one side of the potential storage unit 20 and connected to the wiper 47 of the switch 45 is the other side of the potential storage unit 20. Included in the potential storage unit 20 is the wiper 71 and the contacts 76–79 of the switch 70. One side of a capacitor 95 is connected to the contacts 76–78 and the other side thereof is connected to ground. Similarly, one side of a capacitor 96 is connected to the contact 79 and the other side thereof is connected to ground. In the preferred embodiment, the capacitor 95 is a .2 microfarad Teflon or polystyrene low leakage capacitor and the capacitor 96 is a 1 microfarad Teflon or polystyrene low leakage capacitor.

When the wipers 46–48 are advanced to the contacts 51, 55 and 59, respectively, potential charge across the conductors A and B is transferred to the potential storage unit 20 over the following path: terminal 40, conductor 62, wiper 46, contact 51, conductor 97, potential storage unit 20, wiper 71, wiper 47, contact 55, conductor 63 and terminal 41. Either the capacitor 95 or the capacitor 96 will be charged dependent upon the position of the wiper 71. The wiper 47 of the switch 45 when resting on the contacts 53 or 54 serves to remove or dissipate any residual potential in the potential storage unit 20 prior to the transfer thereto of the charged potential from the conductors A and B.

As previously discussed, the conductors A and B produce a capacitive effect by virtue of the insulation thereof surrounding the conductors thereof. The capacity of the conductors A and B will vary proportionally with the linear distance of uninterrupted tested portions of the conductors A and B. Thus, should the wipers 46–48 remain on the contacts 50, 54 and 58, respectively, for a sufficient length of time, the conductors A and B will store a potential charge commensurate with the capacitive effect thereof or proportional to the linear distance of the uninterrupted tested portions of the conductors A and B. Now, the advancement of the wipers 46–48 to the contacts 51, 55 and 59, respectively, and the resting of the wipers 46–48 on the contacts 51, 55 and 59 for a sufficient length of time transfers potential charge stored across the conductors A and B to the potential storage unit 20. Hence, the potential charge stored in the potential storage unit 20 is proportional to the linear distance of the uninterrupted tested portions of the conductors A and B.

The conventional electrometer tube 25 has the grid 25 thereof connected to the contact 56 of the switch 45 through a resistor 98. In this manner, the potential charge stored in the potential storage unit 20 is applied to the grid 25a of the electrometer tube 25 over the following path: grid 25a of the electrometer tube 25, resistor 98, contact 56 of the switch 45, wiper 47, potential storage unit 20, resistor 99, and back to the cathode 25b of the electrometer tube 25. When the switch 45 has the wipers 46–48 thereof on the contacts 49–51, 53–55, and 57–59, the grid 25a of the electrometer tube 25 is grounded to prevent any potential from being applied thereto until the wipers 46–48 have advanced to the contacts 52, 56 and 60, respectively. This is accomplished through the wiper 48 of the switch 45.

The output or the plate 25c of the electrometer tube 25 is connected to a balancing network 100, which includes resistors 101 and 102, potentiometer 103, and D.C. transistor amplifier 104. One side of the calibrated microampere meter 30 is connected to the balancing network 100. The output or the plate 25c of the electrometer tube 25 is also connected to a conventional D.C. transistor amplifier 105, which has its output connected to the other side of the calibrated microampere meter 30 through the calibrating network 35.

As shown in the drawing, the calibrating network 35 includes the wiper 72 and the contacts 80–83 of the switch 70. In addition, the calibrating network 35 includes variable resistors 106–109, which interconnect the contacts 80–83, respectively, with the other side of the calibrated microampere meter 30.

While the switch 45 has the wiper 48 on either the contacts 57, 58 or 59, the open cable locator 10 is adjusted for a zero current or balanced reading on the calibrated microampere meter 30 for the respective ranges, namely: 0–100 feet, 100 feet–1000 feet, 1000 feet–1 mile, and 1 mile–10 miles. Toward this end, the switch 70 is actuated to rest the wipers 69, 71 and 72 thereof on the contacts 72', 76 and 80. To balance the open cable locator 10 for the 0–100 feet range, the potentiometer 103 is adjusted until there is a zero reading on the calibrated 0–100 feet scale of the microampere meter 30. The variable resistor 106 is adjusted for known potential values to calibrate the scale of the microampere meter 30. Now, the switch 70 is actuated to step the wipers 69, 71 and 72 to the succeeding contacts 73, 77 and 81, respectively, and the variable resistor 107 is now adjusted to calibrate the microampere meter 30 for the 100 feet–1000 feet range against known potential values.

Thereupon, the switch 70 is operated to advance the wipers 69, 71 and 72 thereof to engage the contacts 74, 78 and 82, respectively. This action sets the open cable locator 10 for the 1000 feet to 1 mile range and the variable resistor 108 is adjusted to calibrate the microampere meter 30 against known potential values. Lastly, the switch 70 is activated to move the wipers 69, 71 and 72 for engagement with the succeeding contacts 75, 79 and 83, respectively. At this time, the variable resistor 109 is adjusted to calibrate the microampere meter 30 for the 1 mile to 10 mile range against known potential values.

From the foregoing, it is to be observed the balancing network 100 and the calibrating network 35 form a bridge circuit in conjunction with the calibrated microampere meter 30, which is balanced initially for all scales or ranges. When the charge from the capacitive effect of the conductors A and B is transferred from the potential storage unit 20 to the input of the electrometer tube 25, a change in current flow from the output of the electrometer tube 25 creates an imbalance in the bridge circuit, which imbalance is recorded by the microampere meter 30 to represent the distance of the interruption or open in the conductors A and B from the open cable locator 10.

In the operation of the open cable locator 10, an operator actuates the switch 70 to rest the wipers 69, 71 and 72 on the contacts 75, 79 and 83, respectively. The open cable locator 10 is now set to test for an open cable pair in the 1 mile–10 mile range. Now, the switch 45 is operated to move the wipers 46, 47 and 48 to the contacts 49, 53 and 57, respectively. This action removes or dissipates any residual voltage on the conductors A and B.

Thereupon, the operator actuates the switch 45 to advance the wipers 46, 47 and 48 to the succeeding contacts 50, 54 and 58, respectively. As a consequence thereof, the conductors A and B are charged with a predetermined reference voltage of the magnitude of the battery 86. After a sufficient time has elapsed to charge the conductors A and B with the reference voltage, the switch 45 is again operated to step the wipers 46, 47 and 48 to the succeeding contacts 51, 55 and 59, respectively. This action transfers a potential charge on the conductors A and B to the capacitor 96 of the potential storage unit 20. While the wiper 47 is on the contacts 53 and 54, any residual potential in the potential storage unit 20 is removed.

After the charge is transferred to the capacitor 96, the switch 45 is operated to move the wipers 46, 47 and 48 to the contacts 52, 56 and 60, respectively. As a result thereof, the charge stored in the capacitor 96 is transferred and applied to the grid 25a of the electrometer tube 25. The current flow in the output or plate 25c of the electrometer tube 25 creates an imbalance in the networks 35 and 100, which is recorded on the calibrated microampere meter 30. If the opening in the conductors A and B is between 1 mile and 10 miles from the open cable locator 10, a direct reading of the linear distance can be made from the calibrated meter 30.

If a direct reading in the range 1–10 miles cannot be made from the meter 30, then the switch 70 is actuated to move the wipers 69, 71 and 72 to the contacts 74, 78 and 82, respectively. Now a test is made for the range 1000 feet to 1 mile and the above-described steps for the switch 45 are repeated. The foregoing operations are repeated including the actuation of the switch 70 to the next lower range until a direct reading is made on the microampere calibrated meter 30.

It is to be understood that modifications and variations of the embodiments of the invention disclosed herein may be resorted to without departing from the spirit of the invention and the scope of the appended claims.

Having thus described my invention, what I claim as new and desire to protect by Letters Patent is:

1. An open cable locator comprising terminal means for establishing a connection with conductors to be tested, voltage means connected to said terminal means for applying a predetermined voltage across conductors under test to charge the conductors under test with a potential charge, the conductors storing a charge commensurate with the uninterrupted linear distance thereof, storage means for storing a potential charge, means interconnecting said terminal means and said storage means for transferring potential charge across the conductors under test to said storage means, recording means having a calibrated scale to indicate linear distance and responsive to a potential charge for indicating the magnitude of the potential charge in linear distance, and means interconnecting said storage means with said recording means and responsive to the potential charge on said storage means for operating said recording means, said recording means being operated to give a direct reading of the uninterrupted linear distance of the conductors under test.

2. An open cable locator comprising terminal means for establishing a connection with conductors to be tested, reference voltage means connected to said terminal means for applying a predetermined voltage across conductors under test to charge the conductors under test with a potential charge, the conductors storing a charge commensurate with the uninterrupted linear distance thereof, potential storage means for storing a potential charge, recording means having a calibrated scale to indicate linear distance and responsive to a potential charge for indicating the magnitude of the potential charge in linear distance, and switching means interconnecting said terminal means, said reference voltage means, said potential storage means and said recording means for first applying said reference voltage means across said terminal means to charge the conductors under test with a potential charge and then transferring potential charge on the conductors under test to said storage means for storing a potential thereon representative of the uninterrupted linear distance of the conductors under test and thereupon transferring the potential stored in said potential storage means for application to said recording means, said recording means being operated to give a direct reading of the uninterrupted linear distance of the conductors under test.

3. An open cable locator comprising terminal means for establishing a connection with conductors to be tested, voltage means connected to said terminal means for applying a predetermined voltage across conductors under test to charge the conductors under test, the conductors storing a charge commensurate with the uninterrupted linear distance thereof, storage means for storing a potential charge, means interconnecting said terminal means and said storage means for transferring potential charge on the conductors under test to said storage means, circuit means connected to said storage means and responsive to a potential charge for producing a current flow of a magnitude commensurate with the potential charge, means connected to said storage means and said circuit means for applying the potential charge stored on said storage means to said circuit means for producing a current flow with a magnitude representative of the uninterrupted linear distance of the conductors under test, and meter means having a calibrated scale to indicate linear distance and connected to said circuit means and responsive to the current flow from said circuit means for giving a direct reading of the uninterrupted linear distance of the conductors under test.

4. An open cable locator comprising terminal means for establishing a connection with conductors to be tested, reference voltage means connected to said terminal means for applying a predetermined voltage across conductors under test to charge the conductors under test, the conductors storing a charge commensurate with the uninterrupted linear distance thereof, potential storage means for storing a potential charge, circuit means responsive to a potential charge for producing a current flow with a magnitude commensurate with the potential charge, switching means interconnecting said terminal means, said reference voltage means, said potential storage means and said circuit means for first applying said reference voltage means across said terminal means for application across the conductors under test to charge the conductive under test with a potential charge and then transferring potential charge on the conductors under test to said potential storage means for storing a potential therein commensurate with the uninterrupted linear distance of the conductors under test and thereupon transferring the potential stored in said potential storage means for application to said circuit means for producing a current flow with a magnitude commensurate with the uninterrupted linear distance of the conductors under test, and recording means having a calibrated scale to indicate linear distance and connected to said circuit means and response to the current flow from said circuit means for giving a direct reading of the uninterrupted linear distance of the conductors under tests.

5. An open cable locator comprising terminal means for establishing a connection with conductors to be tested, voltage means connected to said terminal means for applying a predetermined voltage across conductors under test to charge the conductors under test with a potential charge, the conductors storing a charge commensurate with the uninterrupted linear distance thereof, storage means for storing a potential charge, means connected to said terminal means and said storage means for transferring potential charge across the conductors under test to said storage means, circuit means responsive to a predetermined charge for producing a current flow with a magnitude representative of the potential charge, means connected to said circuit means and said storage means for applying the potential charge stored in said storage means to said circuit means for producing a current flow with a magnitude representative of the uninterrupted linear distance of the conductors under test, a meter having a calibrated scale to indicate linear distance and connected to said circuit means and responsive to the current flow from said circuit means for giving a direct reading of the uninterrupted linear distance of the conductors under test, and means interconnecting said circuit means and said meter for balancing said meter for a reference reading and for producing an imbalance in response to a condition of potential charge across the conductors under test to indicate the uninterrupted linear distance of the conductors under test.

6. An open cable locator comprising terminal means for establishing a connection with conductors to be tested, reference voltage means connected to said terminal means for applying a predetermined voltage across conductors under test to charge the conductors under test, the conductors storing a charge commensurate with the uninterrupted linear distance thereof, said reference voltage means being formed with a plurality of varying predetermined voltage magnitudes for respective linear ranges, storage means for storing a potential charge, said storage means being formed with a plurality of varying predetermined capacity magnitudes for respective linear ranges, means connected to said terminal means and said storage means for transferring potential charge across the conductors under test to said storage means, circuit means responsive to a predetermined charge for producing a current flow with a magnitude commensurate with the potential charge, means connected to said storage means and said circuit means for applying the potential charge stored in said storage means to said circuit means for producing a current flow with a magnitude representative of the uninterrupted linear distance of the conductors under test, a meter having a calibrated scale to indicate linear distance and connected to said circuit means and responsive to the current flow from said circuit means for giving a direct reading of the uninterrupted linear distance of the conductors under test, and switching means connected to said reference voltage means and said storage means for selecting the magnitude thereof corresponding to preselected linear distance ranges.

7. An open cable locator comprising terminal means for establishing a connection with conductors to be tested, reference voltage means connected to said terminal means for applying a predetermined voltage across conductors under test to charge the conductors under test with a potential charge, the conductors storing a charge commensurate with the uninterrupted linear distance thereof, said reference voltage means being formed with a plurality of varying predetermined voltage magnitudes for respective linear ranges, storage means for storing a potential charge, said storage means being formed with a plurality of varying predetermined capacity magnitudes for respective linear ranges, means connected to said terminal means and said storage means for transferring potential charge across the conductors under test to said storage means, circuit means responsive to a predetermined charge for producing a current flow with a magnitude representative of the potential charge, means connected to said storage means and said circuit means for applying the potential charge stored in said storage means to said circuit means for producing a current flow with a magnitude representative of the uninterrupted linear distance of the conductors under test, a meter having a calibrated scale to indicate linear distance and connected to said circuit means and responsive to the current flow from said circuit means for giving a direct reading of the uninterrupted linear distance of the conductors under test, network circuit means interconnecting said circuit means and said meter for balancing said meter for a reference reading and for producing an imbalance in response to a condition of potential charge across the conductors under test to indicate the uninterrupted linear distance of the conductors under test, said network circuit means being formed with a plurality of resistors of varying magnitudes for respective linear ranges, and switching means connected to said reference voltage means, said storage means and said network circuit means for selecting the magnitudes thereof corresponding to preselected linear distance ranges.

8. An open cable locator comprising terminal means for establishing a connection with conductors to be tested, voltage means connected to said terminal means for applying a predetermined voltage across conductors under test to charge the conductors under test with a potential charge, the conductors storing a potential charge commensurate with the uninterrupted linear distance thereof, storage means for storing a potential charge, means connected to said terminal means and said storage means for transferring potential charge across the conductors under test to said storage means, recording means having a calibrated scale to indicate linear distance and responsive to a potential charge for indicating the magnitude of the potential charge in linear distance, and means including a high impedance device connected to said storage means and said recording means and responsive to the potential charge on said storage means for operating said recording means, said recording means being operated to give a direct reading of the uninterupted linear distance of the conductors under test.

9. An open cable locator comprising terminal means for establishing a connection with conductors to be tested, voltage means connected to said terminal means for applying a predetermined voltage across conductors under test to charge the conductors under test with a potential charge, the conductors storing a potential charge commensurate with the uninterrupted linear distance thereof, storage means for storing a potential charge, means connected to said terminal means and said storage means for transferring potential charge across the conductors under test to said storage means, circuit means including a high impedance device responsive to a potential charge for producing a current flow with a magnitude commensurate with the potential charge, means connected to said circuit means and said storage means for applying the potential charge on said storage means to said circuit means for producing a current flow with a magnitude representative of the uninterrupted linear distance of the conductors under test, and meter means having a calibrated scale to indicate linear distance and connected to said circuit means and responsive to the current flow from said circuit means for giving a direct reading of the uninterrupted linear distance of the conductors under test.

10. An open cable locator comprising terminal means for establishing a connection with conductors to be tested, reference voltage means connected to said terminal means for applying a predetermined voltage across conductors under test to charge the conductors under test with a potential charge, the conductors storing a potential charge commensurate with the uninterrupted linear distance thereof, potential storage means for storing a potential charge, circuit means including a high impedance device responsive to a potential charge for producing a current flow with a magnitude representative of the potential charge, switching means interconnecting said terminal means, said reference voltage means, said potential storage means and said circuit means for first applying said reference voltage means across the terminal means to charge the conductors under test with a potential charge and then transferring potential charge across the conductors under test to said potential storage means for storing a potential charge therein commensurate with the uninterrupted linear distance of the conductors under test and thereupon transferring the potential stored in said potential storage means for application to said circuit means for producing a current flow with a magnitude representative of the uninterrupted linear distance of the conductors under test, and recording means having a calibrated scale to indicate linear distance and connected to said circuit means and responsive to the current flow from said circuit means for giving a direct reading of the uninterrupted linear distance of the conductors under test.

11. An open cable locator comprising terminal means for establishing a connection with conductors to be tested, voltage means connected to said terminal means for applying a predetermined voltage across conductors under test to charge the conductors under test with a potential charge, the conductors storing a potential charge commensurate with the uninterrupted linear distance thereof, storage means for storing a potential charge, means connected to said terminal means and said storage means for transferring potential charge across the conductors under test to said storage means, circuit means including a high impedance device responsive to a predetermined charge for producing a current flow with a magnitude commensurate with the potential charge, means connected to said circuit means and said storage means for applying the potential charge stored in said storage means to said circuit means for producing a current flow with a magnitude representative of the potential charge, means connected to said circuit means and said storage means for applying the potential charge stored in said storage means to said circuit means for producing a current flow with a magnitude representative of the uninterrupted linear distance of the conductors under test, a meter having a calibrated scale to indicate linear distance and connected to said circuit means and responsive to the current flow of said circuit means for giving a direct reading of the linear distance of the conductors under test, and means interconnecting said circuit means and said meter for balancing said meter for a reference reading and for producing an imbalance in response to a condition of potential charge across the conductors under test to indicate the uninterrupted linear distance of the conductors under test.

12. An open cable locator comprising terminal means for establishing a connection with the conductors to be tested, reference voltage means connected to said terminal means for applying a predetermined voltage across conductors under test to charge the conductors under test with a potential charge, the conductors storing a potential charge commensurate with the uninterrupted linear distance thereof, said reference voltage means being formed with a plurality of varying predetermined voltage magnitudes for respective linear ranges, storage means for storing a potential charge, said storage means being formed with a plurality of varying predetermined capacity magnitudes for respective linear ranges, means connected to said terminal means and said storage means for transferring said potential charge across the conductors under test to said storage means, circuit means including a high impedance device responsive to a predetermined charge for producing a current flow with a magnitude representative of a potential charge, means connected to said circuit means and said storage means for applying the potential charge on said storage means to said circuit means for producing a current flow with a magnitude representative of the uninterrupted linear distance of the conductors under test, a meter having a calibrated scale to indicate linear distance and connected to said circuit means and responsive to the current flow from said circuit means for giving a direct reading of the uninterrupted linear distance of the conductors under test, and switching means connected to said reference voltage means and said storage means for selecting the magnitude thereof corresponding to preselected linear distance ranges.

13. An open cable locator comprising terminal means for establishing a connection with conductors to be tested, reference voltage means connected to said terminal means for applying a predetermined voltage across conductors under test to charge the conductors with a potential charge, the conductors storing a potential charge commensurate with the uninterrupted linear distance thereof, said reference voltage means being formed with a plurality of varying predetermined magnitudes for respective linear ranges, storage means for storing a potential charge, said storage means being formed with a plurality of varying predetermined capacity magnitudes for respective linear ranges, means connected to said terminal means and said storage means for transferring potential charge across the conductors under test to said storage means, circuit means including a high impedance device responsive to a predetermined charge for producing a current flow with a magnitude commensurate with the potential charge, means connected to said circuit means and said storage means for applying the potential charge on said storage means to said circuit means for producing a current flow with a magnitude representative of the uninterrupted linear distance of the conductors under test, a meter having a calibrated scale to indicate linear distance and responsive to the current flow from said circuit means for giving a direct reading of the uninterrupted linear distance of the conductors under test, network circuit means interconnecting said circuit means and said meter for balancing said meter for reference reading and for producing an imbalance in response to a condition of potential charge across the conductors under test to indicate the uninterrupted linear distance of the conductors under test, said network circuit means being formed with a plurality of resistors of varying magnitude for respective linear ranges, and switching means connected to said reference voltage means, said storage means and said network circuit means for selecting the magnitudes thereof corresponding to preselected linear distance ranges.

14. An open cable locator comprising terminal means for establishing a connection with conductors to be tested, reference voltage means connected to said terminal means for applying a predetermined voltage across conductors under test to charge the conductors under test with a potential charge, the conductors storing a potential charge commensurate with the uninterrupted linear distance thereof, said reference voltage means being formed with a plurality of varying predetermined voltage magnitudes for respective linear ranges, storage means for storing a potential charge, means connected to said terminal means and said storage means for transferring potential charge across the conductors under test to said storage means, circuit means including a high impedance device responsive to a predetermined charge for producing a current flow with a magnitude commensurate with the potential charge, means connected to said storage means and said circuit means for transferring the potential charge on said storage means to said circuit means for producing a current flow with a magnitude representative of the uninterrupted linear distance of the conductors under test, a meter having a calibrated scale to indicate linear distance and connected to said circuit means and responsive to the current flow from said circuit means for giving a direct reading of the uninterrupted linear distance of the conductors under test, and switching means connected to said reference voltage means for selecting the magnitude thereof corresponding to preselected linear distance ranges.

15. An open cable locator comprising terminal means for establishing a connection with conductors to be tested, reference voltage means connected to said terminal means for applying a predetermined voltage across conductors under test to charge the conductors with a potential charge, the conductors storing a potential charge commensurate with the uninterrupted linear distance thereof, storage means for storing a potential charge, said storage means being formed with a plurality of predetermined capacity magnitudes for respective linear ranges, means connected to said terminal means and said storage means for transferring the potential charge across said conductors under test to said storage means, circuit means including a high impedance device responsive to a predetermined charge for producing a current flow with a magnitude commensurate with the potential charge, means connected to said storage means and said circuit means for applying the potential on said storage means to said circuit means for producing a current flow with a magnitude representative of the uninterrupted linear distance of the conductors under test, a meter having a calibrated scale to indicate linear distance and connected to said circuit means and responsive to the current flow from said circuit means for giving a direct reading of the uninterrupted linear distance of the conductors under test, and switching means connected to said storage means for selecting the magnitude thereof corresponding to preselected linear distance ranges.

References Cited by the Examiner
UNITED STATES PATENTS

| | | | |
|---|---|---|---|
| 659,357 | 10/1900 | Athearn | 324—52 |
| 1,084,910 | 1/1914 | Stephenson | 324—52 |
| 2,120,391 | 6/1938 | Butterfield | 324—52 |
| 2,499,759 | 3/1950 | Kempf | 324—52 |
| 2,644,136 | 6/1953 | Mullins | 324—123 X |
| 2,798,198 | 7/1957 | Dauphinee | 324—62 |
| 2,937,369 | 5/1960 | Newbold et al. | 324—123 X |
| 3,178,639 | 4/1965 | Hillman | 324—54 |

FOREIGN PATENTS

| | | |
|---|---|---|
| 657,057 | 2/1963 | Canada. |
| 853,317 | 10/1952 | Germany. |
| 880,026 | 6/1953 | Germany. |

OTHER REFERENCES

Electrical Measurements and Measuring Instruments, by Golding, 3rd ed., London, Pitman and Sons, 1940, pp. 472, 473.

WALTER L. CARLSON, *Primary Examiner.*

G. R. STRECKER, *Assistant Examiner.*

Disclaimer 3,290,586.—*Robert E. Anderson*, Sunnyvale, Calif. APPARATUS FOR MEASURING THE DISTANCE TO AN OPEN CIRCUIT IN A CABLE PAIR INCLUDING MEANS FOR STORING A CHARGE COMMENSURATE WITH SUCH DISTANCE. Patent dated Dec. 6, 1966. Disclaimer filed Feb. 19, 1970, by the assignee, *Tel-Design, Inc.*

Hereby enters this disclaimer to claims 8 through 11 and 15 of said patent.
[*Official Gazette May 26, 1970.*]